United States Patent Office 3,238,530
Patented Mar. 1, 1966

3,238,530
DIRECTION FINDING RECEIVER SYSTEMS
Roland Carré and Jean Robert, Paris, France, assignors Compagnie Generale de Telegraphie sans Fil, a corporation of France
Filed Apr. 8, 1963, Ser. No. 271,058
Claims priority, application France, Apr. 10, 1962, 893,914
8 Claims. (Cl. 343—119)

The present invention relates to radar systems and more particularly to radar systems providing a plurality of beams for the determination of elevation.

According to the invention there is provided a radar system comprising a plurality of reception channels respectively connected to a plurality of radiators having respective beams with elevation angles which increase from one beam to the other, and logic circuits coupled to at least some of said channels and arranged for blocking at least some of said channels, said blocking occurring only upon simultaneous reception of signals by predetermined combinations of said radiators.

The invention will be best understood from the following description and appended drawings, wherein.

Tri-dimensional or volumetric radar systems are essentially aimed at indicating the altitude of targets, in addition to providing the usual information as to their azimuth and range.

Two types of radar systems may be used to this end: those with switched lobes and those with simultaneous lobes. When a high information rate is desired as to all possible targets, simultaneous lobe radar systems are generally preferred.

Figure 1:
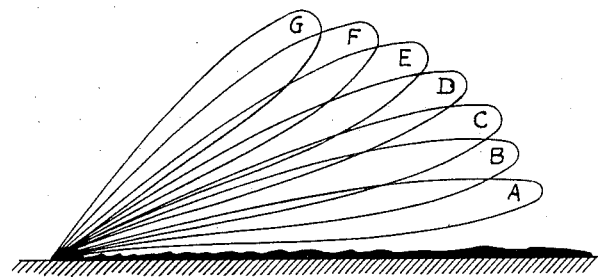
FIG. 1 shows, in vertical section and disregarding the secondary lobes, the radiation pattern of a multiple elevation-beam antenna.

Such radar systems generally radiate simultaneously in several directions, the radiation pattern comprising a plurality of beams as illustrated by way of example in FIG. 1.

In this figure, different beams are indicated by letters A to G, in the order of increasing elevation angles.

When a target is swept by one of the beams, it is possible to determine its altitude from its range and from the coarse indication thus obtained concerning the elevation.

Such a system may be improved in different ways. In particular as in FIG. 1, the main lobes of a radar system may overlap each other and a computer may derive the elevation angle of the target from the energy amounts respectively received in each beam.

However, such a computer would generally provide a correct information only under certain conditions which are not fulfilled, for example, if echo signals of substantial amplitude are received in a number of beams higher than a predetermined number.

Above all, the calculations may be completely distorted due to the existence of secondary lobes in the respective radiation patterns of the radiating elements of the radar system, only the main lobes of which are shown in FIG. 1.

Figure 2:
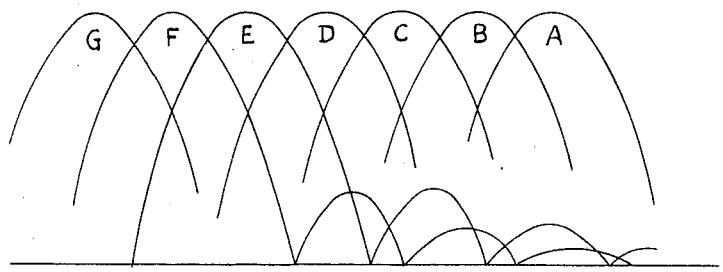
FIG. 2 is a graph showing the secondary lobes of a few among the main lobes of FIG. 1.

In FIG. 2, a radiating pattern has been shown in rectangular coordinates as a function of the elevation angles which are plotted along the abscissae and increase from right to left. In this diagram main lobes E and F and the corresponding secondary lobes have been shown completely, while the other main lobes are shown only in part for the sake of the clarity of the figure.

It is obvious that a strong echo from a low elevation target, which is picked up by a secondary lobe of beam E, provides at the output of the channel which is coupled to the radiator corresponding to beam E, the same signal as a weaker echo from a target having a higher elevation, which is picked up by the main lobe of beam E. Now, the computer arrangement mentioned above is normally devised for a correct operation only in the case of echoes picked up by the main lobes of each beam.

The above examples indicate that it may be of interest to block reception channels when certain conditions prevail, it being understood that other situations than those mentioned above may arise and that the latter are given only by way of example and are by no way limitative. Generally speaking, it is of interest to block the reception channels each time the same are liable to provide the calculator with an erroneous information about the elevation angle, no information being considered better than a false information.

On the other hand, it is also desirable to eliminate, as far as possible, those echoes which may be reasonably considered, from the manner they are respectively picked up by the beams of the pattern, as containing no useful information, which is, for example, the case for ground echoes. The channels where these echoes propagate should then be blocked.

One may also note that certain echoes should be eliminated for both reasons indicated above, to wit as providing a false information and as reflected by targets which are of no interest for the user.

The criteria according to which certain signals should be eliminated depend of course on the nature of the antenna and of the calculator, and on the location of the radar system. They are dictated by common sense considerations or by experience.

In the example which will be described, it will be assumed that the radiation diagram of the antenna of the radar system is of the type illustrated in FIGS. 1 and 2.

The criteria which will be in this case considered as indicative of the necessity of blocking all or part of the receiver channels, are the following:

(a) The simultaneous presence of an echo in the channels which are fed by beams A and E, or A and F, may be considered as indicative of a powerful ground echo, which is picked up by the secondary lobes of the upper beams. Such echoes are of course of no use.

In this example beam E and beam F, rather than beam G, are considered, because it is assumed that the secondary lobes of beam G are not really flush with ground, it being in addition known by experience that, with the type of radar considered, echoes due to an aircraft appear simultaneously at most in four channels.

To eliminate such echoes practically all the channels should be blocked.

(b) The simultaneous presence of echoes in the channels fed by beams A and C, combined with the absence of any echo in the channel fed by beam D, may be assumed to be due to the existence of a fixed target with a low elevation angle if the distance to this target is smaller than about 50 kms.

In this case, only reception channels corresponding to beams A, B and C are to be blocked (it being assumed that B has also been energized).

It has, on the other hand, been noted that under the same conditions, when an echo from a target which is distant more than 50 kms. from the radar system is picked up, this target is very often an aircraft. It has been also noted that echoes from aircrafts are sometimes picked up in beams A to D.

Figure 3:
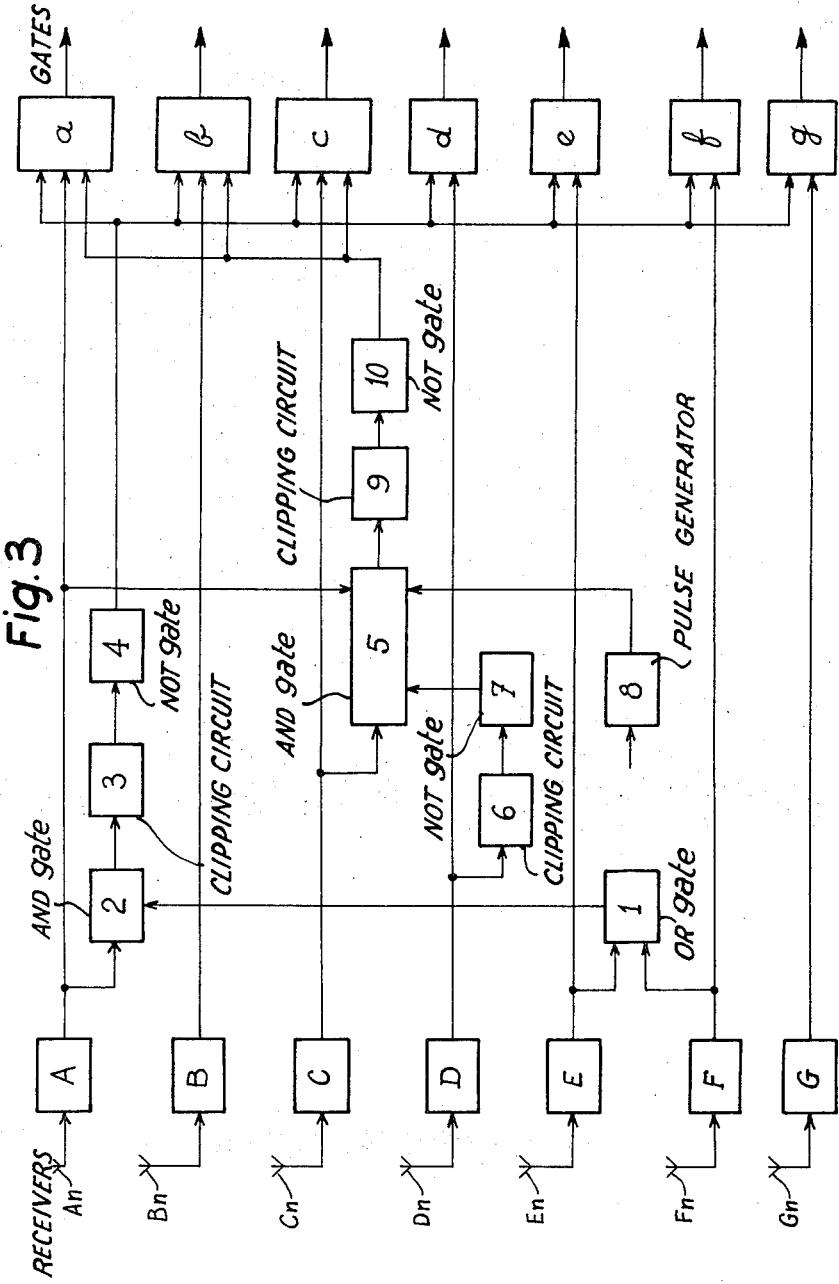
FIG. 3 is a block diagram of a circuit according to the invention for eliminating fixed echoes or echoes which are unusable for altitude determination.

FIG. 3 shows a circuit, which according to the invention, may be used under the above mentioned conditions.

This circuit comprises an aerial system having antennas $A_n$ to $G_n$ respectively coupled to receivers A to G which deliver at the video frequency the echoes respectively picked up in the beams designated by the same letters.

The outputs of receivers A to G are respectively connected to the first inputs of seven AND-circuits $a$ to $g$, acting as interruptors for the signals applied to these first inputs. Circuits $a$, $b$ and $c$ have three inputs, the second and the third being control inputs, while circuits $d$, $e$, $f$ and $g$ have two inputs, the second one being a control input.

The outputs of receivers E and F are also respectively coupled to the two inputs of an OR-circuit 1, whose output is coupled to one input of an AND-circuit 2, whose other input is coupled to receiver A.

Thus, a signal is collected at the output of circuit 2 only if an echo is received simultaneously by receiver A, and by at least one of receivers E and F, which corresponds to the situation considered in criterion (a).

The output circuit 2 is applied to an amplifier, peak-clipper and bottom-clipper circuit 3. The output signal of circuit 3 is applied to a NOT gate 4, of the type used in the computer technique and having the logic function NOT, i.e. delivering an output signal when no input signal is applied thereto and delivering no output signal if an input signal is applied thereto. Thus, circuit 4 delivers a signal only if the condition of criterion (a) is not satisfied. The output of gate 4 is coupled in parallel to the second inputs of AND-circuits $a$ to $g$.

It is thus seen that the transmission of the output signals of any one of receivers A to G will be blocked by the corresponding AND-circuits when the conditions corresponding to criterion (a) prevail.

A four-input AND-circuit 5 has two of its inputs respectively supplied by the outputs of receivers A and C.

The output of receiver D is applied to a circuit 6, similar to circuit 3 and followed by a NOT gate 7. The output of gate 7, which delivers an output signal only if receiver D receives no echo, is connected to the third input of the AND-circuit 5.

A generator 8, which is synchronized by the radar synchronization pulses, delivers square wave signals, the duration of which is equal to that necessary for the radar signals to cover a distance of 50 kms., out and back.

These square-wave signals are applied to the fourth input of the AND-circuit 5, which will thus deliver an output signal when an echo is picked-up in beams A and C, but not in beam D, and is reflected from a target distant less than 50 kms., according to the situation considered in criterion (b).

The output of gate 5 feeds a circuit 9 followed by a circuit 10, circuits 9 and 10 being respectively similar to circuits 3 and 4. The output of gate 10 thus delivers a signal when the conditions of criterion (b) are not satisfied. This output of gate 10 is applied in parallel to the third outputs of circuits $a$, $b$ and $c$.

Circuits $a$, $b$ and $c$ will thus respectively block the output channels of receivers A, B and C when the condition of the criterions (a) and/or (b) are satisfied.

Circuits $d$, $e$, $f$ and $g$ will respectively block the output channels of receivers D, E, F and G when the condition of criterion (a) are satisfied.

The output of the circuits $a$ to $g$ are respectively connected to the corresponding inputs of the altitude computing circuit and/or to surveillance circuits.

It is, of course, to be understood that invention is not limited to the embodiment described and illustrated which is given solely by way of example.

What is claimed is:

1. A direction finding receiver system comprising: an aerial having $n$ antennas, $n$ being an integer, having $n$ respective beams, the respective elevation angles of said beams increasing from one beam to the other, $n$ reception channels, respectively connected to said $n$ antennas, and means for blocking at least a predetermined one of said channels upon simultaneous reception of signals by a predetermined combination of at least two of said radiators, said means comprising a logic network having inputs respectively coupled to at least those of said channels which are coupled to said radiators of said combination and at least one output operatively coupled to said predetermined channel.

2. A direction finding receiver system comprising: an aerial having $n$ antennas, $n$ being an integer, having $n$ respective beams, the respective elevation angles of said beams increasing from one beam to the other; $n$ reception channels, respectively connected to said $n$ antennas; and means for blocking at least one of said channels upon simultaneous reception of signals by predetermined ones among said antennas, said means comprising interrupting means respectively inserted in at least one of said channels, said interrupting means having at least one control input, an AND-gate having a first input, coupled to the channel corresponding to that of said beams which has the lowest elevation angle, a second input and one output; an OR-gate having a plurality of inputs respectively coupled to channels corresponding to higher beams, and one output connected to said second input of said AND-gate; and a NOT gate having one input, connected to said output of said AND-gate, and one output, connected to said interrupting means.

3. A direction finding receiver system comprising: an aerial having $n$ antennas, $n$ being an integer, having $n$ respective beams the respective elevation angles of said beams increasing from one beam to the other; $n$ reception channels, respectively connected to said $n$ antennas; and means for blocking some of said channels upon simultaneous reception of signals by predetermined combinations of said antennas, said means comprising interrupting means respectively inserted in $p$ of said channels respectively corresponding to the $p$ lowest beams, $p$ being an integer smaller than $n$, each of said interrupting means having at least one control input, a first NOT gate having an input coupled to the channel corresponding to the $(p+1)$st beam, and an output, an AND-gate having a first and a second input respectively coupled to the channels corresponding to the first and to the $p$th beams, a third input connected to said output of said first NOT gate, and one output, said last mentioned output being coupled to said control inputs.

4. A direction finding receiver system comprising: an aerial having $n$ antennas, $n$ being an integer, having $n$ respective beams the respective elevation angles of said beams increasing from one beam to the other; $n$ reception channels, respectively connected to said $n$ antennas; and means for blocking some of said channels upon simultaneous reception of signals by predetermined combinations of said antennas, said means comprising interrupting means respectively inserted in those of said channels which respectively correspond to the $p$ beams having the lowest elevation angles, $p$ being an integer smaller than $n$, each of said interrupting means having at least one control input; a first NOT gate having an input coupled to the channel corresponding to the $(p+1)$st beam and an output; an AND gate having a first and a second input respectively coupled to the channels corresponding to the first and to the $p$th beams, a third input connected to said output of said first NOT gate, and an output, and means for operating said AND gate in synchronism with said radar system, a second NOT gate having an input connected to said output of said AND-gate, and an output connected to said interrupting means.

5. A direction finding receiver system comprising: pulse synchronizing means, an aerial having $n$ antennas, $n$ being an integer, having $n$ respective beams the respective elevation angles of said beams increasing from one beam to the other; $n$ reception channels, respectively connected to said $n$ antennas and means for blocking at least one of said channels upon simultaneous reception of signals by predetermined ones among said radiators, said means, comprising: interrupting means respectively inserted in those of said channels which respectively correspond to the $p$ beams having the lowest elevation angles, $p$ being an integer smaller than $n$, each of said interrupting means having at least a first and a second control input; second interrupting means respectively inserted in each of said channels corresponding to the remaining $(n-p)$ beams, each of said second interrupting means having at least one control input; a first AND-gate having a first input coupled to the channel corresponding to the first beam, a second input and an output; an OR gate having a plurality of inputs respectively coupled to channels corresponding to some of the higher beams and an output connected to said second input of said first AND gate; a first NOT circuit having an input, coupled to said output of said first AND gate, and an output coupled to said first control input of each of said first interrupting means and to said one control input of said second interrupting means; a second AND gate, having a first and a second input respectively coupled to the channels corresponding to the first and to the $p$th beams, a third and a fourth input and an output; a second NOT circuit having an input coupled to the channel corresponding to the $(p+1)$st beam, and an output connected to said third input of said second AND gate; a pulse generator having one control input, connected to said output of said radar pulse synchronizing means, and an output, connected to said fourth input of said second AND gate; a third NOT gate having an input connected to said output of said second AND gate, and an output connected to said second control input of said first interrupting means.

6. A direction finding receiver comprising: an aerial having $n$ antennas, $n$ being an integer, having $n$ respective beams, the respective elevation angles of said beams increasing from one beam to the other, $n$ reception channels, respectively connected to said $n$ antennas, means for blocking at least one of said channels upon simultaneous reception of signals by predetermined combinations of said antennas, said means comprising a logic network having inputs respectively coupled to at least some of said channels and at least one output operatively coupled to said one channel and distance responsive means controlling said blocking means of at least one of said channels.

7. A direction finding receiver system comprising: an aerial having $n$ antennas, $n$ being an integer, having $n$ respective beams, the respective elevation angles of said beams increasing from one beam to the other; $n$ reception channels, respectively connected to said $n$ antennas, means for blocking at least one of said channels upon simultaneous reception of signals by predetermined combinations of said antennas, said means comprising a logic network having inputs respectively coupled to at least some of said channels at least one output operatively coupled to said one channel and a further input, and distance responsive means coupled to said further input for controlling said network.

8. A direction finding receiver system comprising: an aerial having $n$ antennas, $n$ being an integer, having $n$ respective beams, the respective elevation angles of said beams increasing from one beam to the other; $n$ reception channels, respectively connected to said $n$ antennas; and means for blocking all of said channels upon simultaneous reception of signals by predetermined ones among said antennas, said means comprising interrupting means inserted in all of said channels, said interrupting means having at least one control input, and AND-gate having a first input, coupled to the channel corresponding to that of said beams which has the lowest elevation angle, a second input and one output; an OR-gate having a plurality of inputs respectively coupled to channels corresponding to higher beams, and one output connected to said second input of said AND-gate; and a NOT gate having one input, connected to said output of said AND-gate, and one output, connected to said interrupting means.

References Cited by the Examiner

UNITED STATES PATENTS 3,070,795  12/1962  Chambers _____ 343—16
3,072,903  1/1963   Meyer _____ 343—16

CHESTER L. JUSTUS, *Primary Examiner.*

R. E. KLEIN, *Assistant Examiner.*